(No Model.)

F. H. HILLS.
POP SAFETY VALVE.

No. 306,686. Patented Oct. 14, 1884.

Witnesses
H. Brown
A. L. White

Inventor
F. H. Hills
by Wright & Brown
Attys.

UNITED STATES PATENT OFFICE.

FRANK H. HILLS, OF NEWTON, MASSACHUSETTS.

POP SAFETY-VALVE.

SPECIFICATION forming part of Letters Patent No. 306,686, dated October 14, 1884.

Application filed April 12, 1884. (No model.)

*To all whom it may concern:*

Be it known that I, FRANK H. HILLS, of Newton, in the county of Middlesex and State of Massachusetts, have invented certain Improvements in Pop Safety-Valves, of which the following is a specification.

This invention has for its object to provide a pop safety-valve adapted to respond quickly to variations in the pressure of the steam, and to close promptly when said pressure has been sufficiently decreased by the opening of the valve.

The invention consists in the provision of a register for the valve, adapted to be opened by the pressure of the escaping steam after the valve is raised, and thereby open passages through the valve for the escaping steam, thus causing the pressure to be rapidly reduced, and enabling the valve to be readily closed by its spring in consequence of the reduction in its area exposed to steam-pressure. The register is shut off from the steam-pressure when the valve is closed, and is provided with a spring whereby it is partially closed after being thus shut off from the steam-pressure, all of which I will now proceed to describe.

Figure 1:
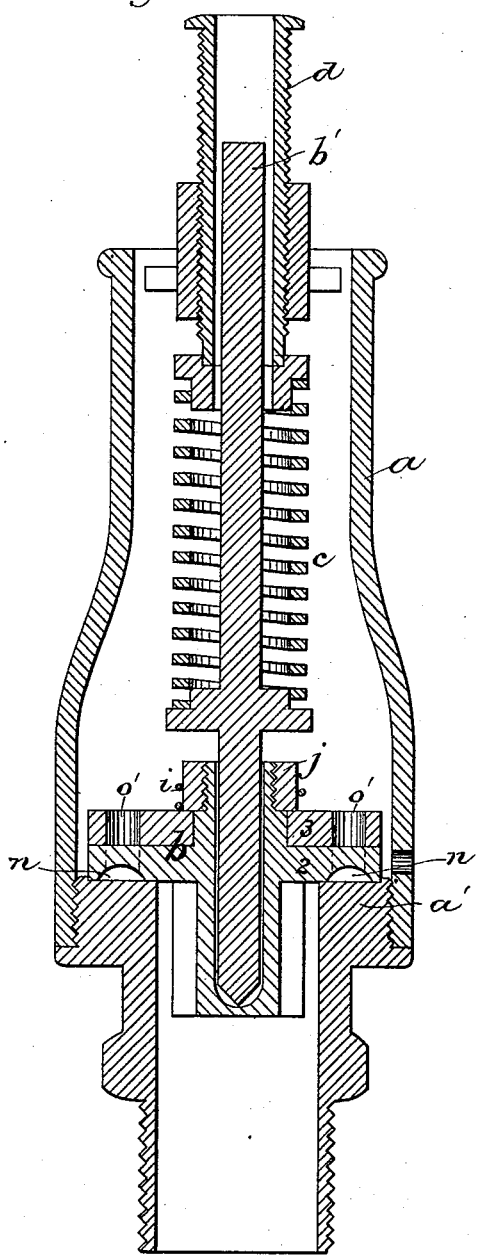
Figure 3:
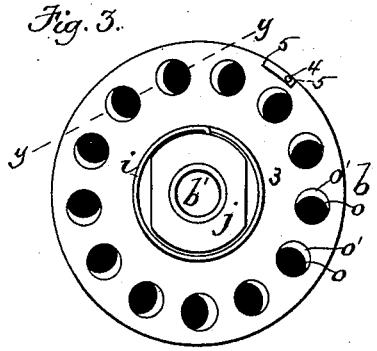
Figure 2:
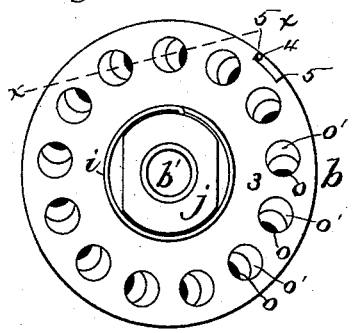
Figure 5:
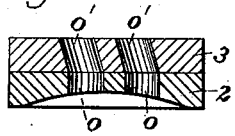
Figure 4:
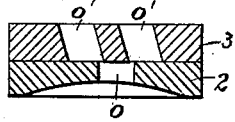

Of the accompanying drawings, forming a part of this specification, Figure 1 represents a longitudinal vertical section of a safety-valve embodying my invention. Fig. 2 represents a top view of the valve, showing its register partly closed. Fig. 3 represents a similar view showing the register fully opened. Figs. 4 and 5 represent, respectively, sections on lines $x\ x$ and $y\ y$, Figs. 2 and 3.

The same letters of reference indicate the same parts in all the figures.

In the drawings, $a$ represents the valve casing or shell, having the valve-seat $a'$, and adapted to be screwed at its lower end into the dome-cover of a boiler.

$b$ represents the valve, which is provided with a stem, $b'$, and a spring, $c$, which forces the valve against its seat, as usual in valves of this class, the spring in this instance being interposed between a collar rigidly attached to the valve-stem, and an adjustable collar which bears against a tubular adjusting-screw, which is screwed into a threaded socket in the upper portion of the shell and regulates the pressure of the spring.

In carrying out my invention I provide the valve with a series of orifices, $o$, extending vertically or substantially at right angles with its under surface, and place a register, 3, on the upper surface of the valve. The register is a wing fitted to a seat formed in the upper surface of the valve, and adapted to rotate thereon to a limited extent, its rotary movements being limited by a stop-pin, 4, on the valve, which is placed between two shoulders, 5 5, constituting the ends of a recess in the periphery of the register. The register is provided with a series of orifices, $o'$, which are adapted to coincide with the orifices $o$, and are formed diagonally, as shown in Figs. 4 and 5. A spring, $i$, secured at one end to the register and at its other end to a collar, $j$, rigidly attached to the valve-stem, holds the register normally in the position shown in Figs. 2 and 4, the orifices in the valve being partially covered by the register, so that the diagonal surfaces of the orifices $o'$ in the ring are exposed to steam passing upwardly through the orifices $o$, as shown in Fig. 2. When the valve is upon its seat, steam from the boiler cannot enter the orifices $o$, the valve-seat projecting under and covering said orifices, as shown in Fig. 1. When the valve is raised by the steam-pressure, the escaping steam passes through the orifices $o$, and impinges against the inclined walls of the orifices $o'$. The pressure thus exerted causes the register to rotate so as to cause its orifices $o'$ to more nearly coincide with the orifices $o$, as shown in Figs. 3 and 5. The passages through the valve are thus enlarged and allow steam to escape more freely, while the area of the valve against which the steam can act to support the valve is correspondingly reduced. These two causes—viz., the increased area for the escape of steam and the decreased area of resistance to the upward pressure of the steam—enable the valve to close quickly when the boiler-pressure falls to a predetermined degree. There is, therefore, no liability of waste of steam, such as is caused in many safety-valves by the failure of the valve to close when the pressure is sufficiently reduced. When the valve closes, the spring $i$ restores the register to the position shown in Figs. 2 and 4. The lower surface of the valve has an annular concavity or groove, $n$, with which the orifices $o$ communicate. Said concavity is covered by the valve-seat when the valve is closed. When the valve rises, the concavity $n$ affords an increased area on the under surface of the valve, enabling the steam to support the valve more effectively. The orifices $o$ in the valve and the register with its oblique orifices constitute what I term an "automatic register" for convenience of description.

I claim—

1. A perforated safety-valve provided with an automatic register, which is also perforated, and is adapted to partially close the openings in the valve when the latter is seated, and is adapted to be opened by the escaping steam when the valve is raised, as set forth.

2. A safety-valve having steam-passages arranged to be closed by the valve-seat when the valve is seated, and provided with a self-closing register adapted to be opened by the escaping steam when the valve is raised, as set forth.

3. In a safety-valve, the combination of the valve having orifices $o$, adapted to be covered by the valve-seat, the annular rotary register having oblique orifices $o'$, adapted to coincide with the orifices $o$; a stop adapted to limit the rotary movements of the ring, and a spring whereby the ring is restored to its normal position after being displaced by the escaping steam, as set forth.

4. A perforated safety-valve having an automatic register, as described, and an annular concavity, $n$, in its lower surface, as set forth.

In testimony whereof I have signed my name to this specification, in the presence of two subscribing witnesses, this 9th day of April, 1884.

FRANK H. HILLS.

Witnesses:
C. F. BROWN,
A. L. WHITE.